Sept. 13, 1949.  F. A. WODAL ET AL  2,481,555
AVERAGING DEVICE
Filed Aug. 4, 1944  2 Sheets-Sheet 1

Inventors
Francis A. Wodal and
Harry M. Crain.

By W Glenn Jones
Attorney

Patented Sept. 13, 1949

2,481,555

UNITED STATES PATENT OFFICE 2,481,555

AVERAGING DEVICE

Francis A. Wodal, Camden, N. J., and Harry M. Crain, Philipsburg, Pa.

Application August 4, 1944, Serial No. 548,132

11 Claims. (Cl. 235—61)

(Granted under the act of March 3, 1883, as amended April 30, 1928; 370 O. G. 757)

This invention relates to integrating devices, and in particular to a device for averaging the readings of an aircraft octant during the time that a sight is taken.

Due to the relatively unstable platform offered by an aircraft in flight it is difficult to exactly determine the angle of a celestial body with an octant. The observer must attempt to hold the octant in a level position with the bubble aligned with the image of the celestial body. With the unpredictable movements of the aircraft due to up and down drafts etc., the observer cannot hold the octant steady and must usually adjust the octant continually in an effort to align the bubble and image.

Since little faith can be credited to any single reading under these conditions, the practice arose of taking a series of readings and computing their average. Recording devices have also been incorporated into the octants, by which means the average reading of the octant could be computed. The present averaging device gives at once, without any computation, the average reading of the octant during the time that the observer was taking the sight. While the device was made for this specific adaptation, it is of course useable in connection with any measuring device where the thing being measured varies during the measurement, or where as in the case of the aircraft octant there is difficulty in making the measurement due to other variable conditions.

It is the primary object of this invention to provide an averaging device which when connected to a measuring device, will continuously indicate the average value of the changing condition being measured.

Another object of this invention is the provision of a combination measuring and averaging device wherein the averaging element is actuated by the measuring element and indicates the average reading of the measuring element.

A further object of this invention is the provision of an averaging device which can be started and stopped at the beginning and end of an observation and may be connected to a measuring device to indicate the average reading of the measuring device during the time that an observation is made.

A further object of this invention is the provision of an integrating device which will indicate the average position of an adjustable mechanism during the time that adjustments are being made.

A further object is the provision of a device for continuously indicating the setting of an adjustable mechanism wherein the device is provided with means operable to reset the device to the same reading as the adjustable mechanism.

Another object is the provision of an averaging device operable to continuously indicate the average setting of an adjustable mechanism and provided with means indicating a measure of the elapsed time during the averaging operation.

Other objects will become apparent from the following description and from the drawings, wherein:

Figure 3 is a perspective view of another embodiment of my invention wherein certain elements of the embodiments of Figures 1 and 2 are dispensed with.

Figures 1, 2:
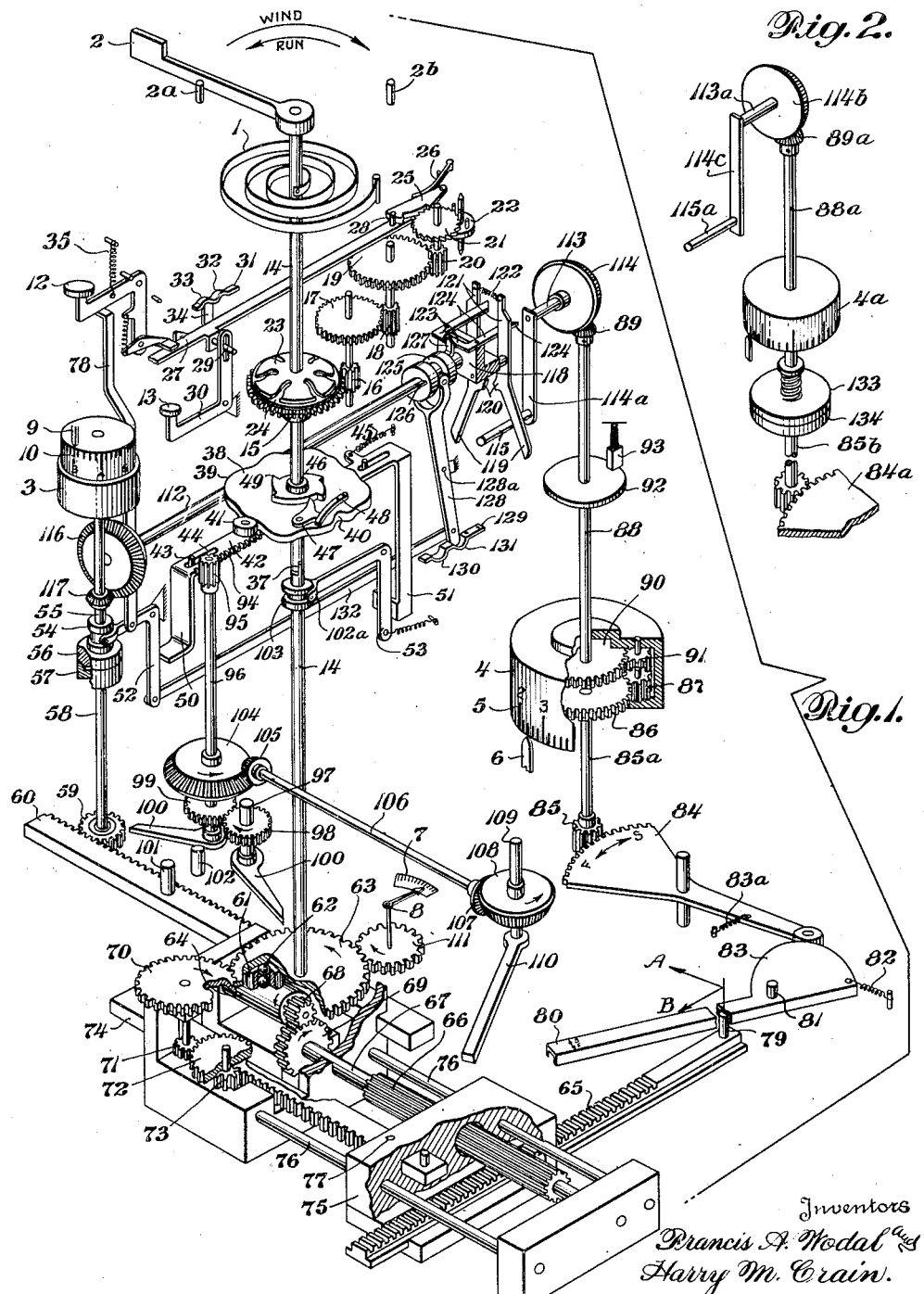
Figure 1 is a perspective view of one embodiment of my invention.
Figure 2 is a partial perspective view of another embodiment of my invention.

The device is driven by a constant speed motor which may be actuated by a spring 1 which is wound by turning a handle 2 clockwise through an angle of 120 degrees. The octant knob is shown at 3. As the octant knob 3 is manipulated to and fro to keep the image of the sun or star aligned with the bubble, a differential casing 4 having an exterior scale 5 is driven by the mechanism so that the average reading of the octant knob 3 during the time of the sight, is indicated by the pointer 6 on the exterior scale 5.

A timer scale 7, graduated in time units, together with a pointer 8, indicates half of the total elapsed time during the sight, which when added to the time at which the sight was begun, gives the mid time of the sight. If a stop-watch or any other clocking device be used, instead of the timer 7—8, then the motor need not be of constant speed type, since it is not necessary for the device to be driven at the same speed for each sight. It is only necessary that the speed of the motor be substantially constant during any one measuring operation or sight.

By a mechanism which will be presently explained, winding of the spring 1 by clockwise movement of handle 2, will also rotate the differential casing 4 so as to give the same indication as that on the scale of the octant knob 3. The differential casing 4 is at the same time coupled directly with the octant knob 3 so that it will rotate with rotation of knob 3.

Thus, at the beginning of a sight, when the operator is adjusting the knob 3 to align the image of the celestial body with the bubble in the octant, the differential casing 4 is rotated in unison with the knob 3, and the reading of the pointer 6 on the scale 5 will be the same as that of pointer 9 on the scale 10 of the octant knob 3.

Also, when the spring 1 is wound by means of the handle 2, the mid-time pointer 8 is rotated back to zero position on the mid-time scale 7.

Thus, by mechanism which will be described, the winding of the spring by means of handle 2 places the device in condition for averaging the readings of pointer 9 on the scale 10 of the octant knob 3 during the time a sight is being taken. After the celestial body is aligned with the bubble in the octant sight (not shown) a starting key 12 is depressed by the operator. This places the averaging device in operation and as the operator continues to adjust the knob 3 during the sight, the average position of pointer 9 on scale 10 is continuously indicated on scale 5 by pointer 6. When the sight is completed the operator depresses the stopping key 13, whereupon the averaging device is stopped. The average reading of pointer 9 on scale 10 during the sight is then shown by pointer 6 on scale 5 and the pointer 8 indicates half of the total elapsed time of the sight on the scale 7.

*Details of construction and operation*

The constant speed motor which is driven by the spring 1 comprises a main shaft 14. The speed of rotation of the main shaft 14 is controlled by a gear train 15, 16, 17, 18, 19, 20 and the escapement mechanism 21, 22 so that shaft 14 is driven at a constant speed. Other means such as an electric motor could be used instead. Mainshaft 14 is turned in a clockwise direction during winding and in a counterclockwise direction during unwinding. In order to prevent operation of the escapement mechanism 20, 21 during winding of the spring, the escapement is designed to operate in only one direction and a clutch mechanism is provided between mainshaft 14 and the gear train 15—20. This permits shaft 14 to be turned to wind spring 1 without subjecting the irreversible escapement mechanism to a large force. In order to accomplish this effect the gear 15 is free to rotate on shaft 14. A spring disc 23 is pinned to shaft 14, with its fingers urging a friction disc 24 against the flat side of gear 15. With this arrangement, when shaft 14 is rotated clockwise by the lever 2 to wind the spring, the gear 15 will be held against rotation by the escapement 21, 22, and the spring disc 23 and friction disc 24 will slip on the gear 15. The spring 1 is not strong enough to cause slipping of elements 23, 24 and 15 when unwinding, and consequently the escapement 21, 22 allows the shaft 14 to rotate only at a constant rate.

The escapement mechanism is locked by means of a pawl 25 which is urged into engagement with the teeth of escapement wheel 21 by the leaf spring 26. When the starting key 12 is depressed the sliding member 27 is moved to the right and a pin 28 disengages pawl 25 from the escapement wheel 21. A pin 29 carried by the sliding member 27 engages a slot in the stopping key lever 30, so that when the starting key 12 is depressed the stopping key 13 is raised. A leaf spring 31 has two recesses 32 and 33 which engage a projecting member 34 on the sliding member to hold it in its rightmost or leftmost position respectively depending on whether the starting or stopping key 12 or 13 was the last one to be depressed. A spring 35 returns the starting key 12 to its raised position after it has been depressed, but the stopping key 13 is raised only by depressing the starting key.

A gear 63 is fixed to the bottom of the mainshaft 14. The shaft 14 is in two parts, divided at the sliding tongue and groove connection 37, so that the part below the connection 37 can be moved axially while the part above the connection is fixed against axial movement.

Journaled for free rotation about the axially fixed portion of shaft 14 is a cam 38 having four raised portions 39, spaced 90 degrees apart. Between each of the raised portions 39 may be recesses 40, 90 degrees apart, and having the same contour radius as that of a cam follower wheel 41.

The cam follower wheel is carried by a reciprocable sliding member 42 which may be guided by the pins 43 engaged in slots 44. A spring 45 urges the member 42 to the right and keeps the cam follower wheel 41 against the cam 38.

A ratchet wheel 46 is fixed to shaft 14 and closely adjacent the cam 38. Pivotally carried by the cam 38 is a pawl 47 which is pressed by a leaf spring 48 against the ratchet wheel 46 so that the pawl will be engaged by one of the teeth 49 on the ratchet wheel when the shaft 14 is rotated in a clockwise direction by the handle 2 during winding of the spring 1.

Thus the cam 38 is rotated clockwise through 90 degrees by means of the ratchet wheel 46 and pawl 47 when the handle 2 is moved completely to the right through an angle of 120 degrees and against the stop 2b, while winding spring 1.

If spring 1 has been completely unwound during the last previous reading, so that handle 2 is stopped by the stop pin 2a, then when winding, shaft 14 and ratchet wheel 46 must move through 30 degrees of the 120 degrees movement before a tooth 49 engages the pawl 47. Otherwise the cam wheel 38 would be moved through more than 90 degrees. If, however, handle 2 and shaft 14 have unwound only 91 degrees from fully wound position during the last reading, then a ratchet tooth 49 will engage pawl 47 when the handle is rewound only through 1 degree.

If during the last sight the shaft 14 has unwound less than 90 degrees, the ratchet wheel teeth 49 will be ineffective to engage the pawl 47 so as to rotate cam 38 and reset the mechanism, since a tooth 49 will not engage pawl 47 until the handle 2 reaches the end of its clockwise winding stroke. Therefore, if a sight is ever taken in such a short time that handle 2 and shaft 14 unwind less than 90 degrees, and after the instrument has been read, the instrument must be further unwound to at least 90 degrees by depressing the starting key 12 before the instrument can be reset by winding. The length of time that a sight is taken will depend upon the steadiness of the airplane and other factors.

While the illustrated embodiment shows a cam having four high points and a four tooth ratchet wheel, this number may be varied, as long as the cam 38 has the same number of high and low points as the ratchet wheel 46 has teeth. Also, the angle through which the shaft 14 is wound and unwound, need not be 120 degrees as in the illustrated embodiment.

The clockwise rotation of cam 38 through 90 degrees will cause the cam follower wheel and the reciprocable sliding member 42 to be moved to the left to the end of its storke, and then to the right again by the spring 45. The sliding member 42 has a projecting leg 50 on one end and a leg 51 on its other end, which legs engage levers 52 and 53, respectively, to rotate them clockwise.

The other leg of lever 52 engages a collar 54 on a clutch member 56 which is slidably keyed to a shaft 55 carrying the octant knob 3.

Clockwise movement of lever 52 thus raises the clutch member 56, which movement disengages member 56 from clutch member 57, fixed to the upper end of shaft 58. At the lower end of shaft 58 is a pinion 59 which engages a sliding rack 60. When the clutch elements 56 and 57 are engaged the pinion 59 will drive the rack 60 to the right or to the left depending upon the direction that the operator rotates the octant knob 3.

Fixedly attached to the rack 60 is an integrating ball block 61. Vertically arranged within the block 61 is a pair of integrating balls 62 which engage each other. One ball projects above the upper surface of block 61 where it is engaged by the lower face of the gear 63 which face acts as an integrating plate, and the other ball projects below the lower surface of the block 61, where it engages the cylindrical surface of an integrator roller 64. As rack 60 is moved to the right or to the left by rotation of knob 3, the integrating balls are moved to the right or to the left along the length of the integrating roller 64. Gear 63 is driven counterclockwise at a constant speed by the spring 1, so that the speed at which the integrating roller 64 is driven will depend upon the distance of the integrating balls 62 from the center of gear 63 at any particular instant.

A variable speed rack 65 is driven by an elongated pinion gear 66 on a shaft 67. The integrating roller 64 drives shaft 67 through gears 68 and 69.

A gear 70 is driven by constant speed gear 63, and through a gear train 71, 72, 73, it drives a constant speed rack 74 to the left at a constant rate. A sliding block 75 which carries the variable speed rack 65 is mounted on fixed guideways 76 and is pinned to the constant speed rack 74 as at 77.

In operation, with the spring 1 driving shaft 14 counterclockwise at a constant rate it is apparent that sliding block 75 will move to the left at a constant rate. In order for the spring 1 to rotate shaft 14, the starting key 12 must have been depressed, which moves push rod 78 down to rotate lever 52 in a counterclockwise direction whereby clutch elements 56 and 57 become engaged.

The gear ratios are so designed, and the position of rack 60 and integrating block 61 at the beginning of a sight is so arranged, that if octant knob 3 is not moved during the sight, the sliding block 75 will move to the left at a speed which has a fixed ratio to the movement of the variable speed rack 65 to the left. Then the path of pin 79 during a sight will be a straight line.

If the gear ratios are so designed that the sliding block 75 and variable speed rack 65 move at the same speed when knob 3 is not moved from its position at the beginning of a sight, then the path of pin 79 will be in a straight line at an angle of 45 degrees to the movement of block 75 and rack 65.

Thus, pin 79 moves in the direction of the arrow A at a constant rate which is representative of time. Pin 79 also travels in the direction of the arrow B at a variable rate which corresponds to the position of octant knob 3, and its position at any time in the direction of the arrow B is representative of the total turns of integrating roller 64. Before starting key 12 is depressed, pin 79 is in axial alignment with the pivot 81.

An averaging arm 80, pivoted at 81 is held against pin 79 by means of a spring 82. It is seen that the angular attitude of arm 80 at any time will be representative of the average position of the octant knob 3 from the time the sight has begun.

In the embodiment shown, when arm 80 has moved in a counterclockwise direction from its position at the beginning of a sight it is indicative of a plus average, or that the average reading of octant knob 3 is greater than the reading was at the beginning of the sight. Conversely, if the arm has moved in a clockwise direction it is indicative of a minus average.

These plus and minus averages are transmitted by a cam 83 on the arm 80 to a swingable sector 84, so as to make the values linear in nature. Sector 84 in turn rotates gears 85 and 86. Gear 86 rotates a planetary gear 87 in the differential casing 4.

A shaft 88 forms one bearing for the differential casing 4. Shaft 88 has a bevel gear 89 at its upper end and a spur gear 90 at its lower end. Spur gear 90 engages a planetary gear 91 carried by the differential casing 4. A friction disc 92, fixedly carried by shaft 88, is engaged by a spring pressed friction brake 93. The brake 93 is sufficiently strong to keep gear 90 and shaft 88 from rotation when gear 86 is rotated by sector 84.

Thus, since gear 90 is held fixed by brake 93, rotation of gear 86 will cause a rotation of the differential casing 4, so that the reading of pointer 6 on scale 5 of the differential casing 4, will be the average reading of the octant knob 3 during the time that the sight was being taken.

When the operator has depressed the stopping key 13 to finish the sight, and has read the average reading from scale 5, the instrument is ready for rewinding and resetting.

In order that the average of the position of knob 3 during a sight be indicated on scale 5 at the end of the sight, means are provided to align the reading on the differential casing with that of the octant knob before the averaging mechanism is cut into operation by depressing key 12.

This resetting mechanism comes into play when the spring 1 is rewound by clockwise rotation of handle 2. As previously described when the spring is rewound the cam 38 is rotated through 90 degrees, whereby levers 52 and 53 are rotated clockwise. This rotation of lever 52 causes the disengagement of clutch elements 56 and 57.

Sliding member 42 which is reciprocated to the left and then back to the right during rotation of cam 38, has rack teeth 94 which engage pinion teeth 95 on a shaft 96. A parallel shaft 97 carries a gear 98 driven by gear 99 on shaft 96. Fingers 100, fixed to the bottom of shafts 96 and 97 are rotated first towards and then away from each other by the movement of sliding member 42. During this motion the fingers 100 will engage a pin 101 on the rack 60 and center the rack so that it is properly positioned for the start of the next reading. A pin 102 carried by the frame of the instrument is located in alignment with the zero position of pin 101, and acts as a stop for the fingers 100.

During the clockwise movement of lever 53 a yoke 102a on one end thereof, which engages a collar 103 on shaft 14, raises that portion of shaft 14 below the tongue and groove connection 37, This raises gear 63 slightly so that its lower or integrating face does not touch the integrating balls 62 during zero positioning of the instrument.

During the reciprocal rotation of shaft 96, a bevel gear 104 thereon drives bevel gear 105, shaft 106 and gears 107 and 108 to reciprocate the rotary shaft 109.

An arm 110 carried by shaft 109, engages pin 79 on the variable speed rack 65 to move the rack 65 back to its zero position.

Pointer 8 is returned to zero on the mid-time scale 7 by the same gears 63 and 111 which move it during a reading, since gear 63 is not disengaged from gear 111 by the slight raising of shaft 14. The return of the rack 74 and slide 75 is performed in the same way as the return of the gear 111 and pointer 8, since gear 68 remains in mesh with gear 70 as well as gear 111 regardless of whether it is lifted by the bell crank yoke 102a or not. During the winding operation the gear 63 returns both the pointer 8 through the gear 111 and the slide 75 through gears 70, 71, 72, 73 and rack 74, to their initial positions.

Means are provided to reset the differential casing 4 so as to read the same as the octant knob 3, since they will ordinarily read differently at the end of a sight.

Shafts 112 and 113 are mounted for rotary movement and in axial alignment with each other. A bevel gear 114 on shaft 113 engages the bevel gear 89 on shaft 88.

Fixed to the other end of shaft 113 is an arm 114a carrying a projecting pin 115. Fixed to one end of shaft 112 is a gear 116 engaging a pinion gear 117 on shaft 55. The shaft 112 is therefore rotated whenever the octant knob 3 is rotated.

At the other end of shaft 112 a support member 118 is fixed to the shaft so as to rotate with it. Pivotally attached to the support member are a pair of fingers 119 provided with stops 120 which limit the movement of the fingers towards each other. The fingers 119 each form a leg of a lever, the other legs 121 being pulled toward each other by a tension spring 122. Because of the spring 122 the fingers 119 will normally be pivoted away from each other.

A pair of levers having superimposed legs 123 are pivoted to support member 118. The other legs 124 of the same levers project between the spring tensioned legs 121. When the legs 124 are spread apart, they spread the legs 121, thus closing the fingers 119 against pin 115 and rotating shaft 113 into angular alignment with shaft 112.

A collar 125 is slidably mounted on shaft 112, being keyed against relative rotation thereto by by means of a key 126. A pin 127 is mounted on the collar 125. When collar 125 is moved to the right the pin 127 pushes against the legs 123 to spread legs 124 and 121 whereby fingers 119 are clamped against the pin 115.

The collar 125 is moved to the right or left by means of a lever 128 pivoted at 128a. The other end of the lever is engaged by a leaf spring 129 having recesses 130 and 131 to resiliently retain collar 125 in its rightmost or leftmost position respectively.

A link 132 connects lever 128 to lever 52. Thus, when starting key 12 is depressed, levers 52 and 128 are rotated counterclockwise and collar 125 is moved to the left to cause fingers 119 to spread apart and release the pin 115.

At the end of a sight reading, when the readings have been indicated and the spring 1 has been rewound, the reciprocation of sliding member 42 during rewinding will move lever 128 clockwise, whereupon it will be held in that position by depression 130 in leaf spring 129 until it is moved again by the starting key.

While shaft 113 and shaft 88 are being moved to zero position the pin 79, sector 84, and shaft 85a, carrying gears 85 and 86, is simultaneously moving towards zero position. It does not matter which arrives first due to the differential action of the gears 86, 87, 90, 91 and the differential casing 4. While shaft 85a always returns to the same zero position, the point to which shaft 88 returns depends upon the position of the octant knob 3.

In the embodiment of Figure 2 the differential casing is eliminated. In this case a drum 4a is fixed to and rotates with shaft 88a. Gears 89a, 114b, shaft 113a, lever 114c, and pin 115a are the same as the corresponding elements in Figure 1.

At the bottom of shaft 88a is fixed the friction disc 133 which is spring pressed against a similar disc 134 on shaft 85b.

In this embodiment the discs 133 and 134 slip during the time that shaft 113a is being aligned with shaft 112 while the spring is being wound. These friction discs 133 and 134 will similarly slip when the octant knob is being moved by the operation to align the octant with a celestial body before the starting key 12 is depressed. In this embodiment, after the fingers 119 have been spread to disengage pin 115, by depressing the starting key 12, the pin 115a, arm 114c, and shaft 113a rotate with the drum 4a as shaft 85b is driven by sector 84a.

Figure 3:
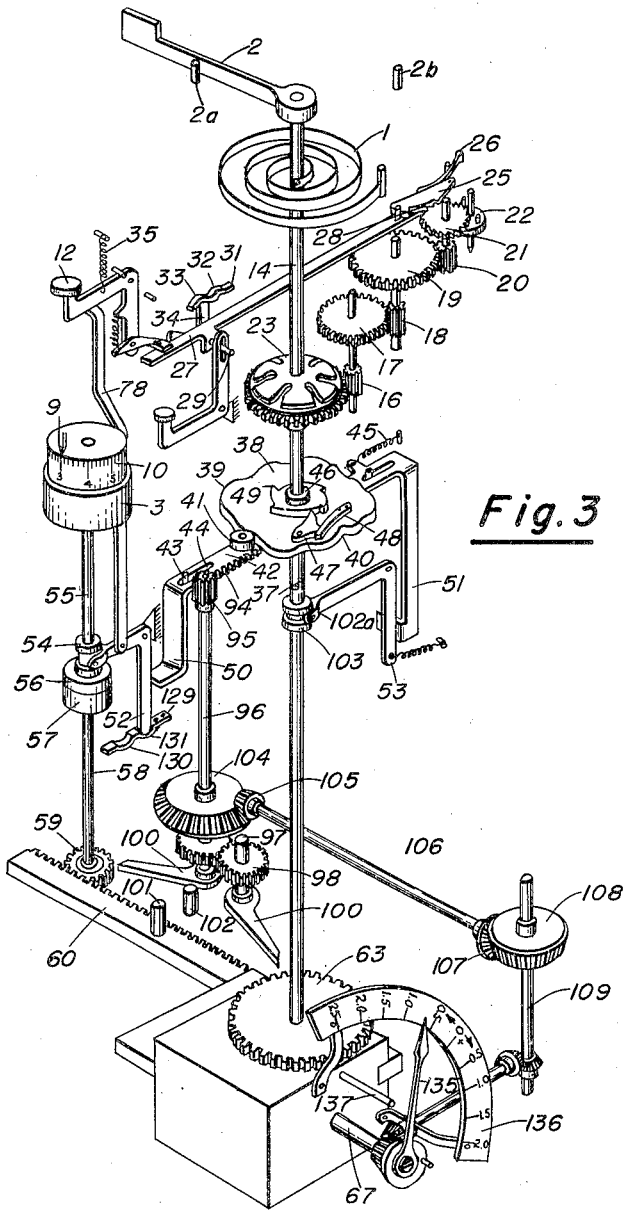

The instrument may be modified by the elimination of the differential casing 4 and the positioning mechanism therefor, which would include the elimination of the elements from gear 116 to the casing 4 and from gears 66 and 70 to the casing 4. In such case, as shown in Figure 3, a pointer 135 may be attached to the shaft 67 instead of the elongated pinion gear 66. A scale 136, graduated in units comparable with those of the scale 10 on octant knob 3, is located behind the pointer 135.

An averaging operation derived from the use of the mechanism in Fig. 3 is predicated on a fixed time period. Therefore, if the knob 3 is not turned, the integrator balls such as 62 (Fig. 1) will remain half way out from the center of the integrating plate or gear 63. The pointer 135 would then travel from the left end of the scale toward the right and would come to rest at the end of the fixed time at the zero point.

If, however, knob 3 were turned to and fro and its average reading were of a minus value, the pointer would then come to rest at a minus position. This value would then be substracted from the initial reading of scale 10 to obtain the average position. It follows, also, that if knob 3 were turned to and fro so that its average position is greater than that mentioned in the first case, the pointer 135 would come to rest at the end of the fixed time period in a plus direction from zero.

This value would then be added to the initial setting on scale 10 to obtain the average position. It can be seen therefore, that the units on scale 136 should be of the same nature as those on scale 10, for this addition or subtraction.

Since the shaft 67 is continuously rotated in a clockwise direction during a sight, the pointer 135 and scale 136 will indicate the total amount of turning of shaft 67 during the sight. When used in connection with an octant, the dial 136 may be graduated as shown. The pointer must be set against the stop 137 before the sight is begun.

This is accomplished during the rewinding act. The requisite clockwise turn of the handle 2 initiates the sequences already described in connection with Fig. 1, including turning of the gearing associated with the shaft 106. Tracing the turning motions down to the shaft 67, it is found that a counterclockwise turn is imparted thereto. This is made possible by the raising of the integrating plate 63 during the rewinding, and the consequent momentary immobilization of the shaft 14 and its appurtenances.

Although a timing device is readily coupled to the mechanism in Fig. 3, actual practice does not demand it. Here the device used to divide time is dispensed with. Therefore, in this embodiment the sight must be taken for a fixed or known length of time, the duration of which can be ascertained from the timing means with which many aircraft octants are provided.

To take a sight, the image of the celestial object will be aligned with the bubble in the octant and the reading of pointer 9 on scale 10 noted just before the starting key 12 is depressed. The sight will be taken for a full fixed period of time which will preferably be about 2 minutes. But the period does not have to be fixed at two minutes. The device in Fig. 1 will continuously average a reading for any length of time up to the time limit of the mechanism. That is to say, if the mechanism is contrived to operate for five minutes, a sight may be averaged for one, two or any fraction of minutes up to the five-minute limit. During the sight the shaft 67 will rotate and pointer 135 will move in a clockwise direction over scale 136. The scale 136 is so graduated that if the octant knob 3 is not moved during the sight the pointer 135 will be at the zero mark on the scale 136 at the end of the sight. This will mean that nothing need be added to or subtracted from the original reading of octant knob 3 at the beginning of the sight.

If the pointer 135 indicates —0.5 at the end of the sight then this figure must be subtracted from the reading of pointer 9 at the beginning of a sight to get the average reading of pointer 9 during the time of the sight. In a similar manner, if pointer 135 reads say +0.8 at the end of the sight, then this amount must be added to the reading of pointer 9 at the beginning of the sight. It is to be understood of course that the sight must be taken for the length of time for which the scale 136 is designed.

When the averaging device is used in connection with some measuring instrument other than an octant, the scale 136 may of course be graduated in other suitable manners, and the averaging period need not necessarily be fixed.

As an example, if the averaging device be used to determine average air speed, the shaft 58 could be actuated by an airspeed diaphragm, and the reading of pointer 135 and scale 136 would then give total air miles, which when divided by elapsed time will give the average air speed.

Various changes may be made in the form of invention shown and described without departing from the spirit of the invention or the scope of the following claims.

The invention herein described may be manufactured and used by or for the Government of the United States of America for governmental purposes without the payment of any royalties thereon or therefor.

What is desired to be claimed is:

1. An averaging device for indicating the average position of a rotatable element during a time interval, comprising a scale for said rotatable element, a constant speed motor including a spring by which the motor is energized, manual spring charging means, starting and stopping means for said motor, a gear driven by said motor, a change-speed drive means for moving a drive pin in one direction, said drive means being driven from said gear and having control means connected by a clutch for adjustment by movements of said rotatable element, a constant speed drive means driven from said gear for imparting movement to said drive pin at an oblique angle to said one direction, a movable indicator scale having a stationary reference point, releasable coupling means between said scale and said rotatable element including a planetary differential gear means for setting both scales to the same readings, means for releasing said coupling operated by said starting means, and means for operating said planetary gear means to turn said movable scale in accordance with the motion of said drive pin to continuously indicate an average reading on said scale, of the indications on the rotatable element scale during the interval of operation of the motor.

2. An averaging device comprising a constant speed motor having a terminal drive gear, a manually operable member provided with an angle scale and indicator, an automatically operable member provided with an angle scale and indicator, means driven by the terminal gear for variable-speed revoluble motion, said means including an integrating block, means driven by the terminal gear for uniform-speed rectilinear movement, an element carried by the rectilinearly driven means and movable transversely thereof by the variably driven means, a rockable arm loosely connected with said element, means actuatable by said manually operable member to position said block along the radius of the terminal gear, thereby to vary the speed of the variable-speed means, the joint acts of the uniform-speed rectilinearly movable means and of the transversely movable element producing an angular resultant position of the rockable arm, and means responding to the angularity of said arm to position the scale of the automatically operable member at an average indication of the scale indications of the manually operable member.

3. An averaging device comprising a constant speed motor having a terminal drive gear, a manually operable member provided with an angle scale and indicator, an automatically operable member provided with an angle scale and indicator, means driven by the terminal gear for variable-speed revoluble motion, said means including an integrating block, means driven by the terminal gear for uniform-speed rectilinear motion, an element carried by the rectilinearly driven means and movable transversely thereof by the variably driven means, a rockable arm loosely connected with said element, a cam on the rockable arm, means actuatable by said manually operable member to position said block along the radius of the terminal gear, thereby to vary the speed of the variable-speed means, the joint acts of the uniform-speed rectilinearly movable means and of the transversely movable element producing an angular resultant position of the rockable arm, and a sector swingably displaceable by said cam and being in driving relationship to said automatically operable member to position the scale of the latter at an average indication of the scale indications of the manually operable member.

4. Averaging device comprising a constant speed motor having a terminal drive gear, a manually turnable member, an automatically turnable member, means including an integrating ball and roller arrangement driven by the terminal gear for variable-speed revoluble motion, said means including an integrating block containing the balls, other means driven by the terminal gear to partake of uniform-speed rectilinear motion, an element carried transversely of and by said other means to partake of its rectilinear motion in one direction and being driven by said variable-speed means to partake of independent transverse motion, means actuatable by said manually turnable member to position said block along the radius of the terminal gear, thereby to vary the speed of the variable-speed means, a drive pin upstanding from said element, a rockable arm loosely connected with said element at the drive pin, said arm having a cam, a turnable sector having a portion bearing against said cam, and a differentially driven gearing operable by said turnable sector in accordance with the angular positions of the rockable arm as the resultant of the effects of the drive pin thereon.

5. An averaging device comprising a constant speed motor, means subject to variable-speed revoluble motion, means subject to uniform-speed rectilinear motion, a terminal gear driven at constant speed by said motor for simultaneously driving both means to simultaneously produce the respective kinds of motion, manual indicator means having related actuating means which by its actuation through the manual means controls the variable-speed means to alter the rate of revoluble motion, an element carried by the uniform-speed means and driven by the variable-speed means thereby subject to movement in one direction at a uniform rate and in another direction at an alterable rate, a drive pin carried by said element, the joint acts of the uniform-speed rectilinearly movable means and of the transversely movable element producing an angular resultant position of said element and its drive pin, and motion-translating means between said drive pin and the automatic indicator means operable by the drive pin as said element assumes said position to set the automatic indicator means at an average of the indications of the manual indicator means.

6. An averaging device comprising a constant speed spring-driven motor, means subject to variable-speed revoluble motion, means subject to uniform-speed rectilinear motion, a terminal gear driven at constant speed by said motor for simultaneously driving both means to simultaneously produce the respective kinds of motion, manual indicator means having related actuating means which by its actuation through the manual means controls the variable-speed means to alter the rate of revoluble motion, an element carried by the uniform-speed means and driven by the variable-speed means thereby subject to movement in one direction at a uniform rate and in another direction at an alterable rate, a drive pin carried by said element, the joint acts of the uniform-speed rectilinearly movable means and of the transversely movable element producing an angular resultant position of said element and its drive pin, motion translating means between said drive pin and the automatic indicator means operable by the drive pin as said element assumes said position to set the automatic indicator means at an average indication of the manual indicator means, a clutch embodied in said related actuating means, being releasable to disconnect said actuating means from the related indicator means, means movable to rewind the motor, and means operable during the rewinding act to release the clutch and thereafter to simultaneously restore the related actuating means, the uniform speed means, said carried element and the motion translating means to predetermined initial positions.

7. In an averaging device, the combination of a spring motor, spring-charging means operable by a single manual motion, a manually operable member for indicating a sequence of readings, a rack bar, a drive pinion in mesh with the rack for reciprocating the bar, an operating connection including a divided shaft extending to said member from said pinion, and an engaged clutch at the division in the shaft, with means functioning during said single manual motion to release the clutch and move the bar to a predetermined initial position with reference to the drive pinion.

8. In an averaging device, a spring motor, spring-charging means operable by a single manual motion, a manually operable member for indicating a sequence of readings, a rack bar, a pair of pins, one on the rack bar the other beside the base in fixed reference to the bar pin, a drive pinion in mesh with the rack for reciprocating the bar, including a divided shaft extending to said member, said pins being misalignable during reciprocation of the rack bar, an engaged clutch at the division in the shaft, turnable fingers centered in respect to the fixed pin, and means functioning during said single manual motion to release the clutch and turn the fingers to align the pins.

9. In an averaging device, a spring motor including a shaft, spring-charging means operable by a single manual motion to turn the shaft and wind the motor spring, a manually operable member for indicating a sequence of readings, a rack bar, a drive pinion in mesh with the rack for reciprocating the bar, including a divided shaft extending to said member, an engaged clutch at the division in the shaft, a cam on the shaft having at least one raised portion and one recess, and means actuated by the transition of said portion and recess with respect thereto during said single manual motion, to release the clutch and move the bar to a predetermined initial position with reference to its drive pinion.

10. In an averaging device, a spring motor including a shaft, spring-charging means operable by a single manual motion to turn the shaft and wind the motor spring, a manually operable member for indicating a sequence of readings, an automatically operable member to indicate an average of the sequence of readings, and zero-setting means operable upon the automatic member at the termination of an average reading, the latter means comprising a shaft, a driving connection between the shaft and the automatic member, said connection including a pin, pivoted and initially separated fingers flanking the pin in a centering position, a slidable member and means acting upon said turning of the shaft to slide the member, and means actuated by said member during its sliding to close the fingers toward the pin, thereby to center the pin between the fingers.

11. In an averaging device, a manually operable member for indicating a sequence of readings, an automatically operable member for indicating the average of said readings, coaxially disposed but separated shafts in driving connection with the respective members, and means operable at the end of a sequence of readings to restore both shafts to a common angular alignment.

FRANCIS A. WODAL.
HARRY M. CRAIN.

REFERENCES CITED

The following references are of record in the file of this patent:

UNITED STATES PATENTS

| Number | Name | Date |
|---|---|---|
| 864,379 | Junghans | Aug. 27, 1907 |
| 1,282,553 | Eaton, Jr. | Oct. 22, 1918 |
| 1,450,410 | Cox | April 3, 1923 |
| 2,128,413 | Hejduk et al. | Aug. 30, 1938 |
| 2,136,213 | Hodgman | Nov. 8, 1938 |
| 2,140,579 | Gray | Dec. 20, 1938 |
| 2,145,347 | Everitt | Jan. 31, 1939 |
| 2,206,252 | Gould | July 2, 1940 |
| 2,248,072 | Fry | July 8, 1941 |
| 2,337,045 | Holt | Dec. 21, 1943 |

FOREIGN PATENTS

| Number | Country | Date |
|---|---|---|
| 842,014 | France | Feb. 20, 1938 |